(12) United States Patent
Mackintosh et al.

(10) Patent No.: US 9,471,292 B2
(45) Date of Patent: Oct. 18, 2016

(54) BINARY TRANSLATION REUSE IN A SYSTEM WITH ADDRESS SPACE LAYOUT RANDOMIZATION

(71) Applicants: David N. Mackintosh, Mountain View, CA (US); John H. Kelm, Sunnyvale, CA (US); Neil A. Campbell, Santa Clara, CA (US)

(72) Inventors: David N. Mackintosh, Mountain View, CA (US); John H. Kelm, Sunnyvale, CA (US); Neil A. Campbell, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 14/256,044

(22) Filed: Apr. 18, 2014

(65) Prior Publication Data

US 2015/0301841 A1 Oct. 22, 2015

(51) Int. Cl.
*G06F 9/45* (2006.01)
*G06F 12/10* (2016.01)

(52) U.S. Cl.
CPC ............. *G06F 8/52* (2013.01); *G06F 12/1009* (2013.01); *G06F 12/1027* (2013.01)

(58) Field of Classification Search
None
See application file for complete search history.

(56) References Cited

U.S. PATENT DOCUMENTS

| | | | |
|---|---|---|---|
| 7,269,825 B1 * | 9/2007 | Adcock | G06F 12/1027 711/113 |
| 7,277,999 B1 * | 10/2007 | Agesen | G06F 12/1027 711/150 |
| 7,290,253 B1 * | 10/2007 | Agesen | G06F 8/52 711/213 |
| 2002/0046305 A1 | 4/2002 | Babaian et al. | |
| 2003/0177167 A1 * | 9/2003 | Lafage | G06F 9/445 709/200 |
| 2004/0133884 A1 * | 7/2004 | Zemach | G06F 8/52 717/138 |
| 2006/0277532 A1 * | 12/2006 | Barraclough | G06F 8/52 717/137 |
| 2008/0244538 A1 | 10/2008 | Nair et al. | |
| 2009/0182976 A1 * | 7/2009 | Agesen | G06F 12/1009 711/207 |
| 2010/0228936 A1 * | 9/2010 | Wright | G06F 12/1009 711/163 |
| 2012/0117355 A1 | 5/2012 | Campbell et al. | |
| 2013/0262838 A1 * | 10/2013 | Al-Otoom | G06F 8/52 712/225 |
| 2014/0122847 A1 * | 5/2014 | Henry | G06F 9/4401 712/243 |

OTHER PUBLICATIONS

Ebcioglu et al., "Dynamic binary translation and optimization," 2002, IEEE Transactions on Computers, vol. 50, Issue 6, pp. 529-548.*

(Continued)

*Primary Examiner* — Thuy Dao
*Assistant Examiner* — Stephen Berman
(74) *Attorney, Agent, or Firm* — Grossman, Tucker, Perreault & Pfleger, PLLC

(57) ABSTRACT

Generally, this disclosure provides systems, methods and computer readable media for binary translation (BT) reuse. The system may include a (BT) module to translate a region of code from a first instruction set architecture (ISA) to a second ISA, for execution associated with a first process. The BT module may also be configured to store a first physical page number associated with the translated code and the first process. The system may also include a processor to execute the translated code and to update a virtual address instruction pointer associated with the execution. The system may further include a translation reuse module to validate the translated code for reuse by a second process. The validation may include generating a second physical page number based on a page table mapping of the updated virtual address instruction pointer and matching the second physical page number to the stored first physical page number.

23 Claims, 7 Drawing Sheets

(56) References Cited

OTHER PUBLICATIONS

Wang et al., "StarDBT: An Efficient Multi-platform Dynamic Binary Translation System," 2007, Advances in Computer Systems Architecture, vol. 4697 of the series Lecture Notes in Computer Science, pp. 4-15.*

Ung et al., "Machine-adaptable dynamic binary translation," 2000, Proceedings of the ACM SIGPLAN workshop on Dynamic and adaptive compilation and optimization, pp. 41-51.*

International Search Report and Written Opinion received for PCT Application No. PCT/US2015/019567, mailed on Jun. 1, 2015, 10 pages.

Alexander Klaiber, "Low-power x86-Compatible Processors Implemented with Code Morphing™ Software", The Technology Behind Crusoe™ Processors,Transmeta Corporation, Jan. 2000, 18 Pages.

David Mackintosh, "Moonrun ASLR Support", Intel Labs, Apr. 23, 2013, 22 Pages.

Dehnert, et al., "The Transmeta Code Morphing! Software: Using Speculation, Recovery, and Adaptive Retranslation to Address Real-Life Challenges", Appeared in the Proceedings of the First Annual IEEE/ACM International Symposium on Code Generation and Optimization, Transmeta Corporation, Mar. 27-29, 2003, pp. 1-10.

Microsoft, "Windows ISV Software Security Defenses", Apr. 18, 2014, pp. 1-11. Available at: http://msdn.microsoft.com/en-us/library/bb430720(d=printer).aspx.

Symantec Corporation, "An Analysis of Address Space Layout Randomization on Windows Vista™", Symantec Advanced Threat Research, Ollie Whitehouse, Architect, Copyright © 2007, 19 Pages.

* cited by examiner

600

```
Perform a binary translation of a region of code from a first
instruction set architecture (ISA) to a second ISA of a
processor, for execution associated with a first process
610
```
↓
```
Store a first physical page number associated with the
binary translation and the first process
620
```
↓
```
Store an offset of a virtual address instruction pointer
associated with the binary translation and the first process
630
```
↓
```
Update the virtual address instruction pointer during
execution by the processor
640
```
↓
```
Verify that the binary translation is valid for reuse for
execution associated with a second process by:
(1) generating a second physical page number based on a
page table mapping, the mapping based on the updated
virtual address instruction pointer and the stored offset;
(2) matching the second physical page number to the stored
first physical page number
650
```

FIG. 6

BINARY TRANSLATION REUSE IN A SYSTEM WITH ADDRESS SPACE LAYOUT RANDOMIZATION

FIELD

Example embodiments described herein generally relate to binary translation (BT) systems, and more particularly, to reuse of binary translations in a system employing Address Space Layout Randomization (ASLR).

BACKGROUND

Computing systems may employ binary translation (BT) to translate code dynamically from a public instruction set architecture (ISA), such as, for example the Intel® x86 architecture, to a private or native ISA that is executed by the processors or cores. The capability of a computing system to support the public ISA enables the execution of legacy code that generally provides backward compatibility and access to a large collection of existing software. The native ISA, on the other hand, may be designed to provide increased processor performance or improved power consumption. Additionally, the processors may be regularly updated or re-designed to take advantage of new technology which may change their native ISA while still maintaining the public ISA and the ability to run existing software.

The translation cost is typically high, however, so it is desirable to store translations in memory for reuse whenever possible, for example when the same sequence of instructions is executed at a later point in time and the previous translation remains valid. This allows the cost of the translation to be amortized over time.

Address Space Layout Randomization (ASLR) is increasingly used by operating systems (OSs) to provide security between processes running in different virtual address spaces. ASLR may randomly (or pseudo-randomly) modify the virtual addresses associated with pages of code of different processes, even though those code pages are mapped to the same physical address. This may prevent malicious code from launching an attack that relies on a common layout of code between different processes or between the executions of the same process on the same or different processors.

The use of ASLR, however, typically invalidates stored translations because the validity of a previously stored translation may require that the virtual address, physical address and page attributes of the region of code to be translated match up with those of the stored translation. This may therefore prevent the binary translator from reusing previous translations and may significantly reduce the overall efficiency of the binary translation system.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 6 illustrates a flowchart of operations of another example embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for binary translation (BT) reuse, for example in a system that includes a processor and operating system (OS) configured for Address Space Layout Randomization (ASLR). A BT module of this system may be configured to translate regions of code from a first instruction set architecture (ISA) to a second ISA suitable for execution by the processor (e.g., an ISA native to the processor). The regions of code may include shared code that can be reused by different processes or applications, enabling the cost of the translation to be amortized, if the code regions remain valid for each process that attempts to use it. A translation reuse module may be configured to verify the validity of a code region, as will be explained in greater detail below, based on the physical page numbers and page attributes of memory pages associated with that code region. A translated code region may be determined as valid for reuse by different processes even though the virtual addresses that map each process to the code region may differ, for example due to ASLR, so long as the physical page numbers and page attributes for those regions remain unchanged from their values associated with the original translation.

Figure 1:
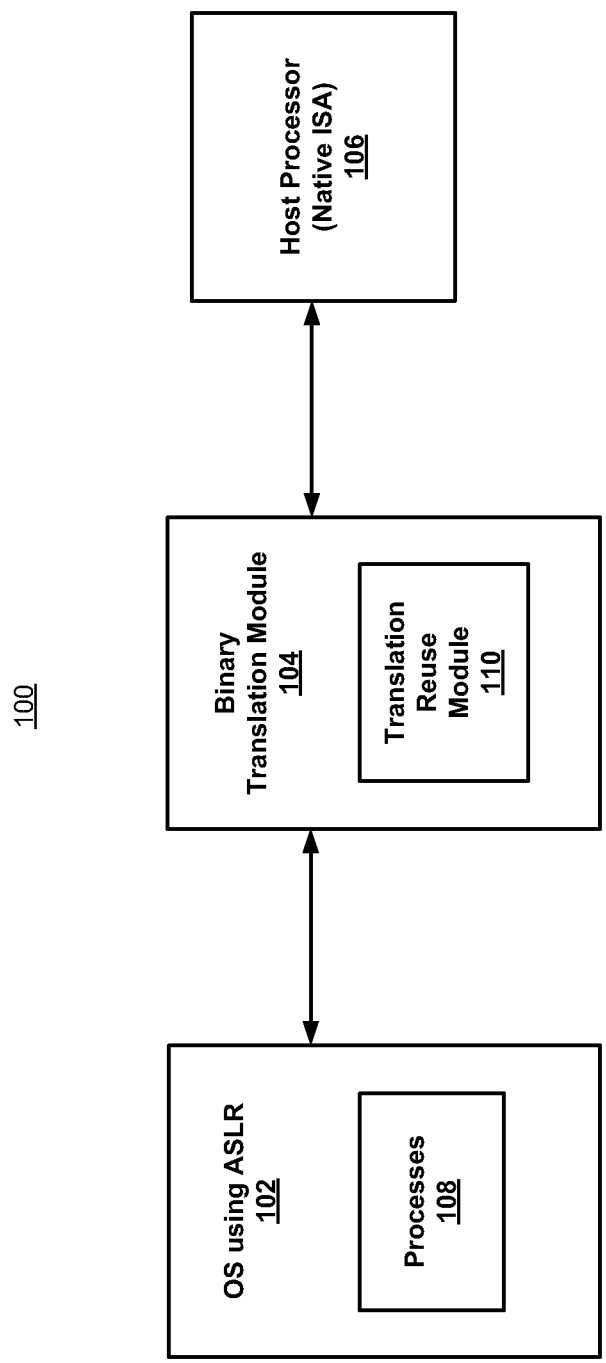
FIG. 1 illustrates a top level system diagram of an example embodiment consistent with the present disclosure.

FIG. 1 illustrates a top level system diagram 100 of an example embodiment consistent with the present disclosure. An OS that is configured for ASLR 102 is shown to host one or more processes or applications 108. The ASLR may provide security between processes running in different virtual address spaces by randomly modifying the virtual addresses associated with the code pages of the different processes, even though those code pages are mapped to the same physical address. This may prevent malicious code from launching an attack that relies on a common layout of code between different processes or between the executions of the same process on the same or different processors.

A binary translation module 104 is configured to translate regions of code, associated with the processes 108, from a first ISA to a second ISA. The first ISA may be a public ISA such as, for example, the Intel® x86 architecture or a variant thereof. The second ISA may be the native ISA that is executed by the host processor 106. The native ISA may generally bear little or no resemblance to the public ISA. While the public ISA provides support for legacy code that enables access to a large collection of existing software, the native ISA may be designed for targeted goals such as, for example, increased processor performance or improved power consumption. The processors may be regularly updated to take advantage of new technology and may change their native ISA while maintaining the ability to run existing software.

The processes/applications 108 may include OS components (including Basic Input-Output System (BIOS), device drivers, etc.) and/or any other software such as, for example, higher level applications or other user provided code that is run on the system. The processes 108 may share common code, such as for example library routines and the like. Translation reuse module 110 may be configured to determine if a previously translated region of code associated with one process may be reused by another process, thus avoiding the expense of re-translation. Reuse may be permitted if memory pages in the translated code remain valid between the times they were translated on behalf of a first process and the times that they might be reused by a second process. The validation may be based on the physical page numbers and page attributes of the translated regions of code, as will be explained in greater detail below.

Figure 2:
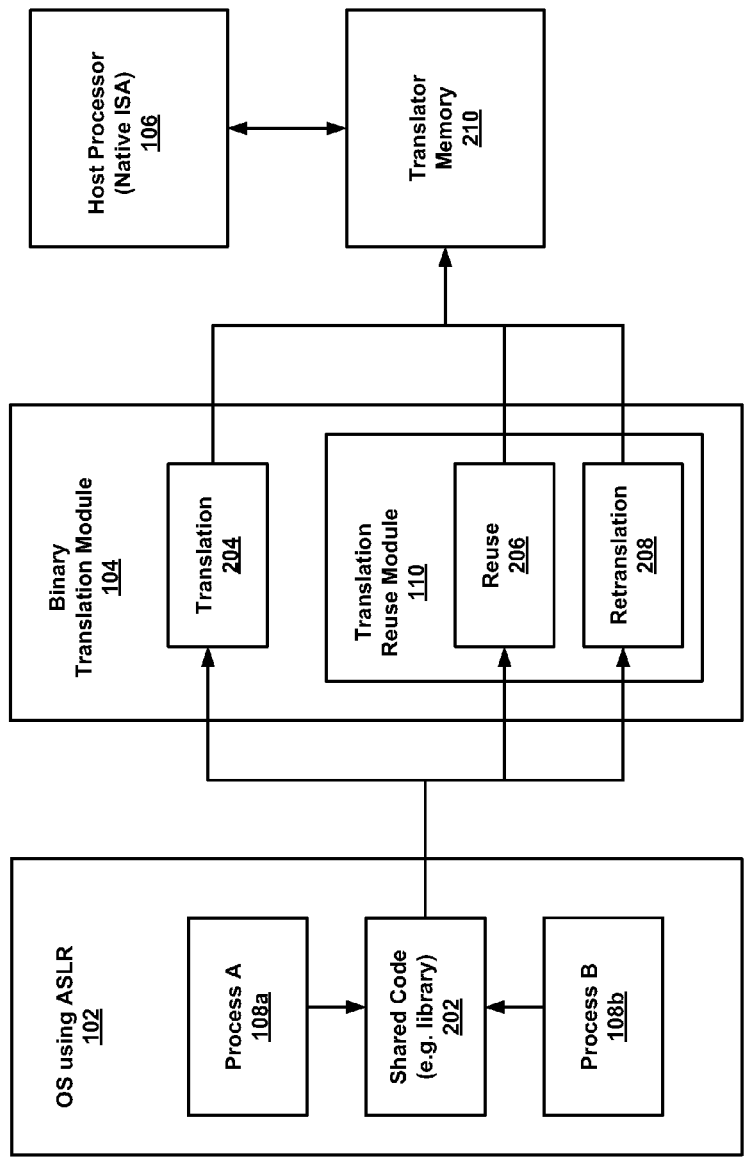
FIG. 2 illustrates a block diagram of one example embodiment consistent with the present disclosure.

FIG. 2 illustrates a block diagram 200 of one example embodiment consistent with the present disclosure. The OS configured for ASLR 102 is shown, for illustrative purposes, to host two processes, process A 108a and process B 108b, although in practice any number of processes may be hosted. Shared code 202, which may for example include common library functions, is shared by processes 108a and 108b. BT translation module 104 may be configured to translate 204 a region of code, for example from the shared code/library 202, when that code is needed (called) by process A 108a. Translation reuse module 110 may be configured to determine if the previously translated region of code may be reused 206 when called by process B 108b. If reuse is not possible, then the region of code, or parts thereof, may be retranslated 208. The translated code may be stored in translator memory or other suitable storage that is accessible by processor 106 for execution.

Figure 3:
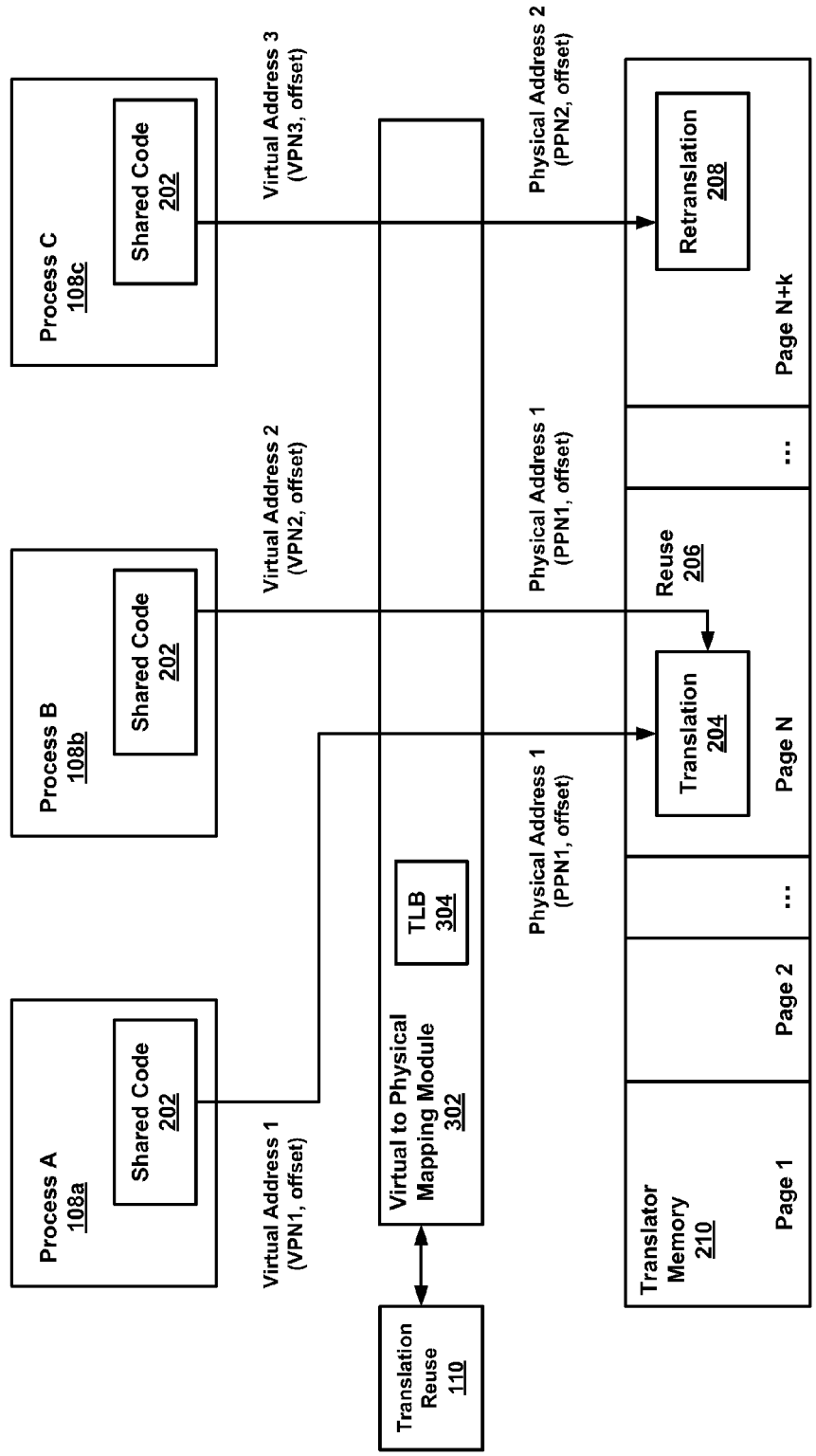
FIG. 3 illustrates a block diagram of another example embodiment consistent with the present disclosure.

FIG. 3 illustrates a block diagram 300 of another example embodiment consistent with the present disclosure. In this more detailed illustration, three processes are shown: process A 108a, process B 108b and process C 108c, all of which may utilize shared code 202 at various times. Each process may be associated with a different virtual address that identifies a memory space for that process. The virtual address may include a virtual page number (VPN) and an offset. The ASLR system may randomly assign or modify the VPNs (but generally not the offsets) associated with each process. A virtual address to physical address mapping module 302 may be configured to map the virtual addresses to physical addresses, for example through the use of page tables or other suitable mechanisms. The physical addresses may include a physical page number (PPN) and an offset. A region of code may span one or more memory pages and each page will have a virtual address (VPN and offset) and corresponding physical address (PPN and offset).

Instruction pointer registers, for both virtual and physical addresses, provide address pointers to the instruction that is currently being executed by the processor 106. The virtual address instruction pointer register may be referred to as the RIP and the physical address instruction pointer register may be referred to as the PIP. The address offset may generally be stored in the lower order bits of these registers while the page numbers (VPN/PPN) may generally be stored in the higher order bits.

In this example, shared code 202 from process A 108a has a virtual address 1 that includes VPN1 (and an offset), while shared code 202 from process B 108b has a virtual address 2 that includes VPN2 (and an offset) and shared code 202 from process C 108c has a virtual address 3 that includes VPN3 (and an offset). Process A 108a may be the first process to call a library routine from the shared code 202 which may cause that region of code to be translated 204 into page N of translator memory 210. The translation is shown to have a physical address 1 that includes PPN1 (and an offset) that point to a location in page N where the translated code now resides.

When process B 108b calls that same shared code library routine, the associated virtual address (VPN2) is mapped to a physical address, which in this case is the same as the physical address of the previous translation (i.e., PPN1 plus offset). Translation reuse module 110 detects this fact and determines that the translation 204 remains valid for reuse 206 by process B.

Continuing with this example, however, when process C 108c calls that same shared code library routine, the associated virtual address (VPN3) is mapped to a different physical address (i.e., PPN2 plus offset). Translation reuse module 110 also detects this fact and determines that the translation 204 is therefore not valid for reuse by process C and instead causes a retranslation 208 which may be mapped into a different page, for example page N+k as illustrated.

In some embodiments, the page tables may be cached in a translation lookaside buffer (TLB) 304 that is configured to provide faster access and more efficient virtual to physical address translations. The TLB may store the more frequently used translation page tables.

In addition to page numbers and offsets, the virtual and physical addresses may also include or be associated with a page attribute or context indication. The page attribute may indicate an access mode (for example, read/write/executable types of access permission), page size, mapping state, modification state and/or caching policy. These page attributes may also be employed by the translation reuse module 110 as part of the translation validity check. For example, if the page attribute associated with the physical address mapping from process A differs from the page attribute associated with the physical address mapping of process B, then the translation 204 may no longer be considered valid for reuse 206 by process B. Additionally, in some embodiments, the translation reuse module 110 may be configured to verify that the translated code has not changed, for example as a result of the execution of self-modifying or cross-modifying code, as part of the validity check.

In some embodiments, the translation reuse module 110 may also be configured to insert or embed instructions into one or more pages of the translated code, which, when executed, may assist in the validation of those pages for translation reuse. These embedded instructions may be referred to as an Inter-Page Prologue (IPP), or simply prologue, and may further be configured to validate pages during control transfers (e.g., branching) between different pages of the translated regions of code. The IPP may include instructions and/or data that provide an indication of the VPN and PPN used by the BT module 104 during the original translation of those pages. The IPP may then access the page tables to determine if the VPN to PPN mapping is still valid and the page is executable. If these checks fail, a fault may be raised resulting in the translation being discarded and a new translation being generated. Alternatively, in the case of a fault, the processor may execute code in a lower performance mode (e.g., without the benefit of some aspects of the translation) until a new translation can be generated at a future point in time.

Figure 4:
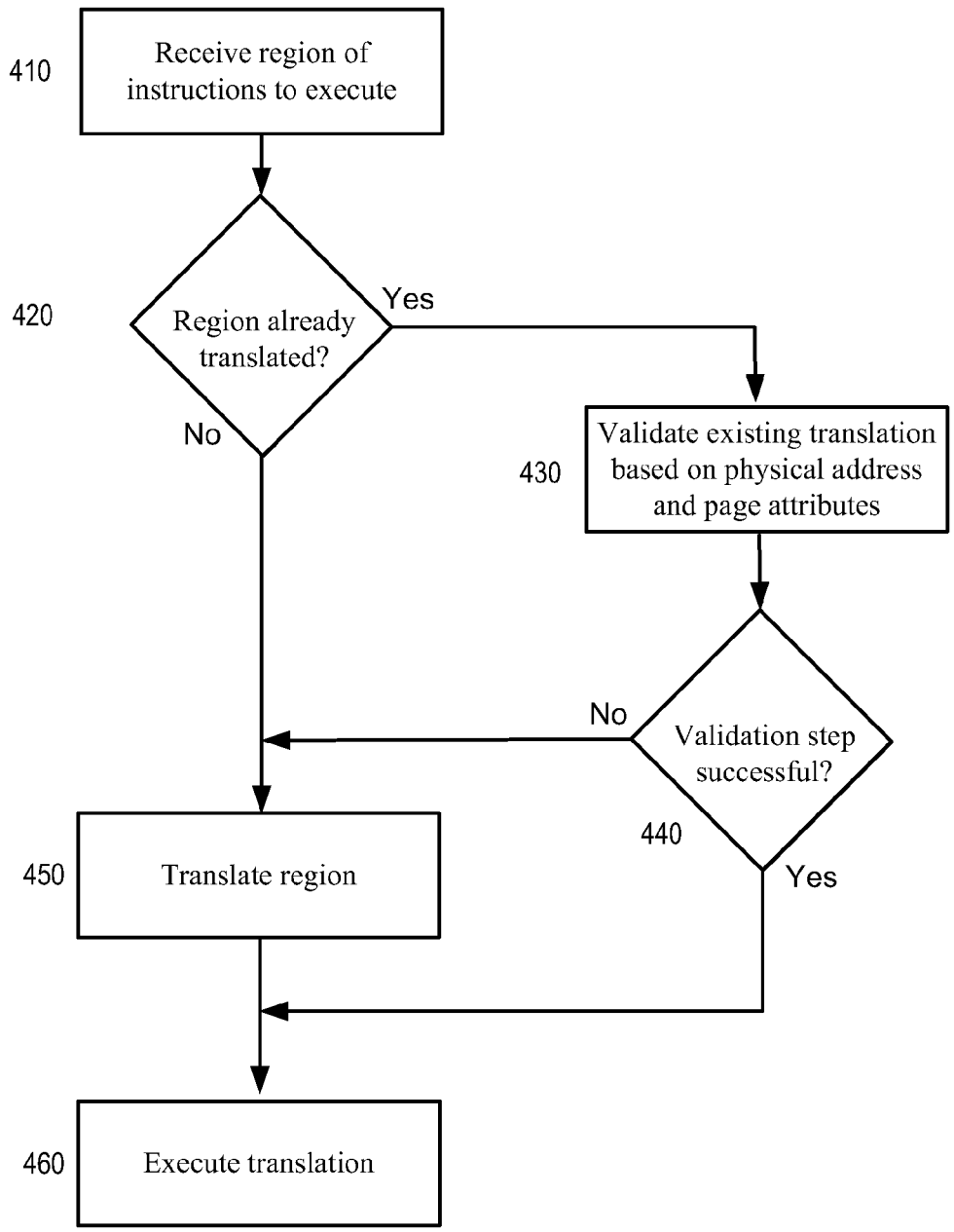
FIG. 4 illustrates a flowchart of operations of one example embodiment consistent with the present disclosure.

FIG. 4 illustrates a flowchart of operations 400 of one example embodiment consistent with the present disclosure. The operations provide a method for BT reuse. At operation 410, a region of code or instructions is received for execution. At operation 420, a check is performed to determine if the region has been previously translated. If not, then the region is translated, at operation 450, and executed at operation 460. If the region has already been translated, then at operation 430, the existing translation is validated. The validation is based on the physical address and the page attributes of the translation. If the validation is successful, the translation is reused and executed, at operation 460, otherwise the region is re-translated at operation 450.

Figure 5:
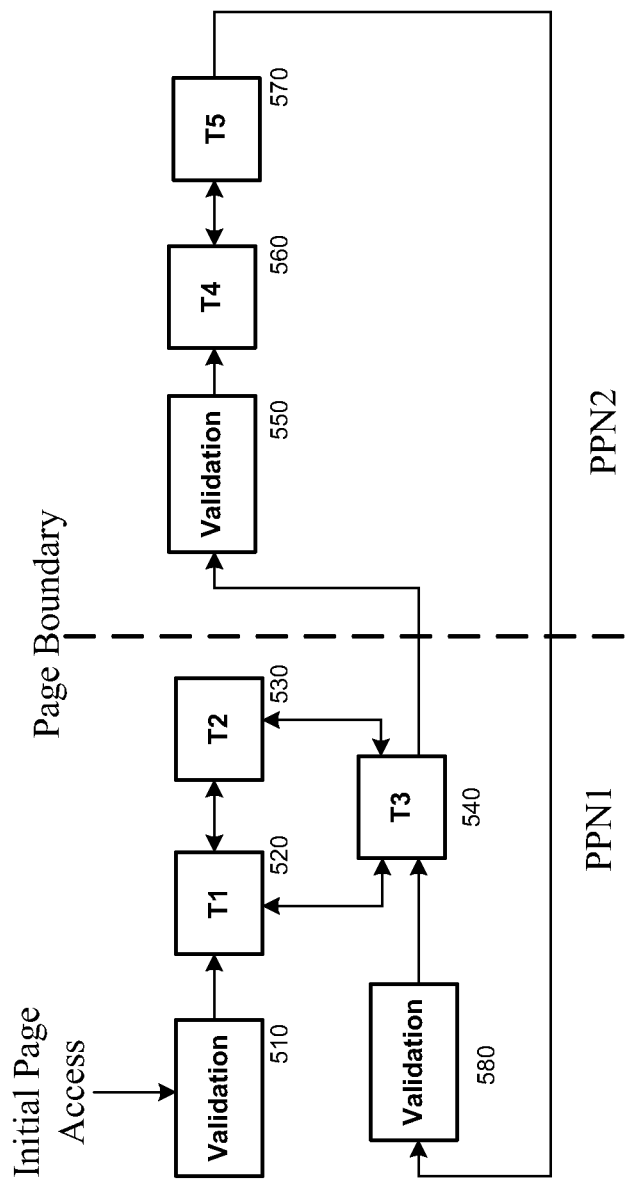
FIG. 5 illustrates a flow diagram of operations of one example embodiment consistent with the present disclosure.

FIG. 5 illustrates a flow diagram of operations 500 of one example embodiment consistent with the present disclosure. Shown are a first instruction translation region (T1) 520, a second instruction translation region (T2) 530, a third instruction translation region (T3) 540, a fourth instruction translation region (T4) 560 and a fifth instruction translation region (T5) 570. Chaining and/or branching of execution between the translation regions is also shown by directed line segments along with a number of validation operations 510, 550 and 580. Translation regions T1, T2 and T3 are mapped to a first memory page associated with a page number PPN1, while translation regions T4 and T5 are mapped to a second memory page associated with a page number PPN2. It will be appreciated that the number of translation regions, the number of validation operations and their interconnection across page boundaries is presented as an illustrative example and may, of course, vary.

Validation operation 510 may be performed upon initial access to, or execution of, the translations on the first memory page to verify the validity of that page. Execution may proceed through translation regions T1, T2 and T3 until a page boundary is crossed, at which point a validation operation 550 is performed to verify the validity of the second page. If, after execution of translation regions T4 and T5, the page boundary is again crossed, then validation operation 580 may be performed to verify that the first page is still valid for execution.

The validation operations may be performed by the IPP that is included or embedded in the translated code associated with each memory page, for example by the translation reuse module 110. The IPP may include instructions and/or data to provide the virtual address and physical address that was associated with that page when the original translation was performed. The IPP may also include instructions to access the page tables that provide the mapping between the current virtual address instruction pointer and the current physical address instruction pointer. The instruction pointers are associated with the current instruction being executed by the processor 106. The current virtual address instruction pointer may be maintained as described below. The IPP may further determine if the current physical address and page attributes match the physical address and page attributes at the time of translation and thus if the translation regions on that page are valid for execution. The VPN portion of the virtual address that was in use at the time of the original translation (and which may be randomly modified by the ASLR) is not used for the validation match.

The current virtual address instruction pointer may be maintained or updated, for example by the processor 106 or the BT module 104, as execution proceeds. In some embodiments, the current virtual address instruction pointer may be maintained for use by the IPP in a hardware register (referred to as FL_RIP) and may be updated using an instruction included in the native ISA (referred to as ADDRIP). The ADDRIP instruction may be configured to modify the offset component of the virtual address stored in the FL_RIP register in a relatively efficient manner. In some embodiments, for example, a memory page size may be 4 k bytes and the virtual address offset may therefore be 12 bits in length. The ADDRIP instruction may thus be configured to clear the least significant 12 bits of the FL_RIP register and add a new value to that register, where the new value is stored as an immediate operand of the ADDRIP instruction.

The IPP may use the ADDRIP instruction in this manner to effect a relative branch, where the immediate operand represents the relative branch offset. In the case of an absolute branch, whether direct or indirect, the IPP may simply write a new value into the FL_RIP register corresponding to the absolute branch location. In the case of subroutine calls and returns, the return virtual address may be computed and pushed onto the stack at call time and later popped from the stack at return time and written to the FL_RIP register. Branches that do not cross page boundaries do not need to update the FL_RIP register since that register need only maintain the correct VPN and an intra-page branch would only affect the offset. Most operations (instructions) that involve the FL_RIP register supply a page offset which is implicitly combined with the VPN in the FL_RIP. This reduces the number of FL_RIP update instructions that are required in the translated code. In some embodiments, the FL_RIP register may also be used as an implicit base with an offset to implement RIP-relative addressing for loads and stores BT systems.

In some embodiments, IPP checks may be added to the translated code dynamically. For example, it may be statically determined (e.g., at the time of the translation) that there are no branches entering the translation region from any other pages and therefore the generation and insertion of an IPP for that translation region may be avoided to reduce overhead. At some later point (e.g., during execution) the system may detect a page transition into that translation region and dynamically insert an IPP, in-place, to handle the validation check. This may increase system efficiency by inserting IPPs only when necessary.

FIG. 6 illustrates a flowchart of operations 600 of another example embodiment consistent with the present disclosure. The operations provide a method for BT reuse, for example in a system that employs ASLR. At operation 610, a binary translation of a region of code is performed. The BT is a translation from a first ISA to a second ISA, where the second ISA is native to the processor. The translation is performed for execution associated with a first process. At operation 620, a first physical page number is stored. The first physical page number is associated with the binary translation and the first process. At operation 630, an offset of a virtual address instruction pointer is stored. The offset is associated with the binary translation and the first process. At operation 640, the virtual address instruction pointer is updated during execution by the processor. At operation 650, the binary translation is verified to be valid for reuse for execution associated with a second process. The verification includes generating a second physical page number based on a page table mapping, the mapping based on the updated virtual address instruction pointer and the stored offset. The verification also includes matching the second physical page number to the stored first physical page number.

Figure 7:
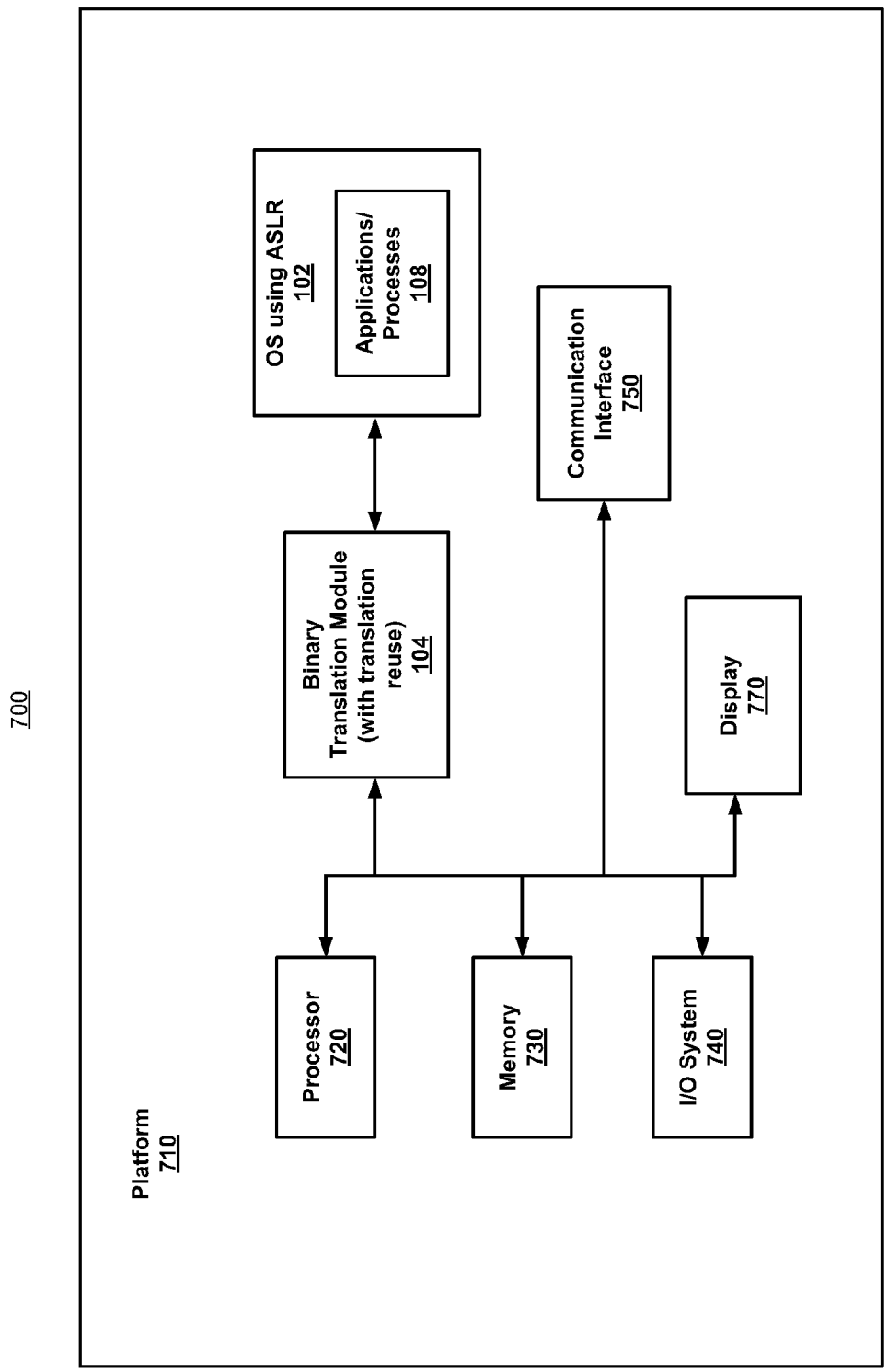
FIG. 7 illustrates a top level system diagram of a platform of another example embodiment consistent with the present disclosure.

FIG. 7 illustrates a top level system diagram 700 of a platform 710 of another example embodiment consistent with the present disclosure. The platform 710 be a hardware platform or computing device such as, for example, a smart phone, smart tablet, personal digital assistant (PDA), mobile Internet device (MID), convertible tablet, notebook or laptop computer, desktop computer, server, smart television or any other device whether fixed or mobile. The device may generally present various interfaces to a user via a display 770 such as, for example, a touch screen, liquid crystal display (LCD) or any other suitable display type.

The system 700 is shown to include a processor 720. In some example embodiments, processor 720 may be implemented as any number of processor cores. The processor (or processor cores) may be any type of processor, such as, for example, a micro-processor, an embedded processor, a digital signal processor (DSP), a network processor, a field programmable gate array or other device configured to execute code. Processor 720 may be a single-threaded core or, a multithreaded core in that it may include more than one hardware thread context (or "logical processor") per core. System 700 is also shown to include a memory 730 coupled to the processor 720. The memory 730 may be any of a wide variety of memories (including various layers of memory hierarchy and/or memory caches) as are known or otherwise available to those of skill in the art. System 700 is also shown to include an input/output (IO) system or controller 740 which may be configured to enable or manage data communication between processor 720 and other elements of system 700 or other elements (not shown) external to system 700. System 700 may also include communication interface 750 configured to enable communication between system 700 and any external entities. The communications may conform to or otherwise be compatible with any existing or yet to be developed communication standards including mobile phone communication standards. For example, the communication interface 750 may use a predetermined wired or wireless communications protocol, such as but not limited to an Internet Protocol, WI-FI protocol, BLUETOOTH protocol, a wide area network (WAN), combinations thereof, and the like. The communication interface 750 may therefore include hardware (i.e., circuitry), software, or a combination of hardware and software allowing the hardware platform 710 to send and receive data signals to/from any of the external entities.

The system 700 may further include binary translation module 104 configured to provide translation reuse in connection with OS 102 employing ASLR hosting applications/processes 108.

It will be appreciated that in some example embodiments, the various components of the system 700 may be combined in a system-on-a-chip (SoC) architecture. In some embodiments, the components may be hardware components, firmware components, software components or any suitable combination of hardware, firmware or software.

Example embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The processor 720 may be any device capable of processing data including, for example, a microprocessor configured to carry out specific operations based on input data, or capable of executing instructions included in computer readable code. For example, the processor 720 may be configured to be programmed to operate according to some example embodiments and the memory 730 may be configured to store the program. The type and nature of the processor 720 may be selected based on numerous factors such as form factor, desired power consumption, desired processing capability, combinations thereof, and the like. Non-limiting examples of suitable processors that may be used in the processing unit 240 include the mobile and desktop processors commercially available from INTEL®, Advanced Micro Devices (AMD®), APPLE®, SAMSUNG®, and NVIDIA®.

The storage medium may be any storage medium capable of storing, containing or carrying instruction(s) and/or data and may include any type of tangible medium, for example, any type of disk including floppy disks, optical disks, compact disk read-only memories (CD-ROMs), compact disk rewritables (CD-RWs), digital versatile disks (DVDs) and magneto-optical disks, non-volatile memory, semiconductor devices such as read-only memories (ROMs), random access memories (RAMs) such as dynamic and static RAMs, erasable programmable read-only memories (EPROMs), electrically erasable programmable read-only memories (EEPROMs), flash memory devices (which may include, for example NAND or NOR type memory structures), magnetic or optical cards,), combinations thereof and/or any type of media suitable for storing electronic instructions.

As used in any example embodiment herein, the term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry," as used in any embodiment herein, may include, for example, singly or in any combination, hardwired circuitry, programmable circuitry such as computer processors comprising one or more individual instruction processing cores, state machine circuitry, software and/or firmware that stores instructions executed by programmable circuitry. The circuitry may be embodied as an integrated circuit, such as an integrated circuit chip. Software and/or applications may be embodied as code or instructions which may be executed on programmable circuitry such as a host processor or other programmable circuitry.

Thus, the present disclosure provides systems, devices, methods and computer readable media for binary translation reuse. The following examples pertain to further embodiments.

According to example 1 there is provided a system for binary translation reuse. The system may include a binary translation module to translate a region of code from a first instruction set architecture (ISA) to a second ISA, for execution associated with a first process. The binary translation module of this example may further be configured to store a first physical page number associated with the translated code and the first process. The system of this example may also include a processor to execute the translated code and to update a virtual address instruction pointer associated with the execution. The system of this example may further include a translation reuse module to validate the translated code for reuse by a second process. The validation may include generating a second physical page number based on a page table mapping of the updated virtual address instruction pointer; and matching the second physical page number to the stored first physical page number.

Example 2 may include the elements of the foregoing example, and the binary translation module is further to store an offset of the virtual address instruction pointer associated with the translated code and the first process; and the page table mapping is further based on the stored offset.

Example 3 may include the elements of the foregoing examples, and the binary translation module is further to store a first page attribute associated with the translated code and the first process; and the processor is further to determine an updated page attribute associated with the translated code and the second process; and the validation further includes matching the stored first page attribute with the updated page attribute.

Example 4 may include the elements of the foregoing examples, and the binary translation module is further to perform a second binary translation of the region of code for execution associated with the second process, if the validation fails.

Example 5 may include the elements of the foregoing examples, and the system further includes a register (FL_RIP) to maintain the updated virtual address instruction pointer, and the processor provides an instruction (ADDRIP) to modify an offset of the virtual address instruction pointer in the FL_RIP register, the ADDRIP instruction associated with the second ISA.

Example 6 may include the elements of the foregoing examples, and virtual page numbers associated with the translated code differ between the first process and the second process due to Address Space Layout Randomization (ASLR).

Example 7 may include the elements of the foregoing examples, and the binary translation further includes embedding a prologue in the translated region of code, the prologue including instructions to: store the first physical page number and the offset; and perform the validation in response to detecting that execution of the binary translation traverses a memory page boundary.

Example 8 may include the elements of the foregoing examples, and the updating of the virtual address instruction pointer is performed in association with execution of a branch instruction.

Example 9 may include the elements of the foregoing examples, and the page table is cached in a translation lookaside buffer (TLB).

Example 10 may include the elements of the foregoing examples, and the system is a smart phone, a laptop computing device, a smart TV or a smart tablet.

Example 11 may include the elements of the foregoing examples, and the system further includes a user interface, and the user interface is a touch screen.

According to example 12 there is provided a method for binary translation reuse. The method may include performing a binary translation of a region of code from a first instruction set architecture (ISA) to a second ISA of a processor, the binary translation for execution associated with a first process. The method of this example may also include storing a first physical page number associated with the binary translation and the first process. The method of this example may further include storing an offset of a virtual address instruction pointer associated with the binary translation and the first process. The method of this example may further include updating the virtual address instruction pointer during execution by the processor. The method of this example may further include verifying that the binary translation is valid for reuse for execution associated with a second process. The verification may include generating a second physical page number based on a page table mapping, the mapping based on the updated virtual address instruction pointer and the stored offset; and matching the second physical page number to the stored first physical page number.

Example 13 may include the elements of the foregoing examples, and further includes storing a first page attribute associated with the binary translation and the first process; and determining an updated page attribute associated with the binary translation and the second process; and the verifying further includes matching the stored first page attribute with the updated page attribute.

Example 14 may include the elements of the foregoing examples, and further includes performing, if the verifying fails, a second binary translation of the region of code for execution associated with the second process.

Example 15 may include the elements of the foregoing examples, and the updating of the virtual address instruction pointer further includes maintaining the virtual address instruction pointer in a register (FL_RIP); and executing an instruction (ADDRIP) to modify an offset of the virtual address instruction pointer in the FL_RIP register, and the ADDRIP instruction is associated with the second ISA.

Example 16 may include the elements of the foregoing examples, and virtual page numbers associated with the binary translation differ between the first process and the second process due to Address Space Layout Randomization (ASLR).

Example 17 may include the elements of the foregoing examples, and the binary translation further includes embedding a prologue in the translated region of code, the prologue including instructions to store the first physical page number and the offset; and perform the verification in response to detecting that execution of the binary translation traverses a memory page boundary.

Example 18 may include the elements of the foregoing examples, and the updating of the virtual address instruction pointer is performed in association with execution of a branch instruction.

Example 19 may include the elements of the foregoing examples, and the page table is cached in a translation lookaside buffer (TLB).

According to example 20 there is provided a system for binary translation reuse. The system may include means for performing a binary translation of a region of code from a first instruction set architecture (ISA) to a second ISA of a processor, the binary translation for execution associated with a first process. The system of this example may also include means for storing a first physical page number associated with the binary translation and the first process. The system of this example may further include means for storing an offset of a virtual address instruction pointer associated with the binary translation and the first process. The system of this example may further include means for updating the virtual address instruction pointer during execution by the processor. The system of this example may further include means for verifying that the binary translation is valid for reuse for execution associated with a second process. The verification may include means for generating a second physical page number based on a page table mapping, the mapping based on the updated virtual address instruction pointer and the stored offset; and means for matching the second physical page number to the stored first physical page number.

Example 21 may include the elements of the foregoing examples, and further includes means for storing a first page attribute associated with the binary translation and the first process; and means for determining an updated page attribute associated with the binary translation and the second process; and the verifying further includes means for matching the stored first page attribute with the updated page attribute.

Example 22 may include the elements of the foregoing examples, and further includes means for performing, if the verifying fails, a second binary translation of the region of code for execution associated with the second process.

Example 23 may include the elements of the foregoing examples, and the updating of the virtual address instruction pointer further includes means for maintaining the virtual address instruction pointer in a register (FL_RIP); and means for executing an instruction (ADDRIP) to modify an offset of the virtual address instruction pointer in the FL_RIP register, and the ADDRIP instruction is associated with the second ISA.

Example 24 may include the elements of the foregoing examples, and virtual page numbers associated with the binary translation differ between the first process and the second process due to Address Space Layout Randomization (ASLR).

Example 25 may include the elements of the foregoing examples, and the binary translation further includes means for embedding a prologue in the translated region of code, the prologue including instructions to store the first physical page number and the offset; and perform the verification in response to detecting that execution of the binary translation traverses a memory page boundary.

Example 26 may include the elements of the foregoing examples, and the updating of the virtual address instruction pointer is performed in association with execution of a branch instruction.

Example 27 may include the elements of the foregoing examples, and the page table is cached in a translation lookaside buffer (TLB).

According to another example there is provided at least one computer-readable storage medium having instructions stored thereon which when executed by a processor, cause the processor to perform the operations of the method as described in any of the examples above.

According to another example there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for binary translation reuse, said system comprising:
  a binary translation circuitry to translate a region of code from a first instruction set architecture (ISA) to a second ISA, for execution associated with a first process;
  said binary translation circuitry further to store a first physical page number associated with said translated code and said first process;
  a processor to execute said translated code and to update a virtual address instruction pointer associated with said execution;
  a translation reuse circuitry to validate said translated code for reuse by a second process, said validation comprising:
  generating a second physical page number based on a page table mapping of said updated virtual address instruction pointer; and
  matching said second physical page number to said stored first physical page number;
  wherein said binary translation circuitry is further to store an offset of said virtual address instruction pointer associated with said translated code and said first process;
  wherein said page table mapping is further based on said stored offset; and
  wherein said binary translation further comprises embedding a prologue in said translated region of code, said prologue comprising instructions to:
  store said first physical page number and said offset; and
  perform said validation in response to detecting that execution of said binary translation traverses a memory page boundary.

2. Wherein said binary translation circuitry is further to store an offset of said virtual address instruction pointer associated with said translated code and said first process; and
  said page table mapping is further based on said stored offset.

3. Wherein said binary translation circuitry is further to perform a second binary translation of said region of code for execution associated with said second process, if said validation fails.

4. The system of claim 1, further comprising a register (FL_RIP) to maintain said updated virtual address instruction pointer, wherein said processor provides an instruction (ADDRIP) to modify an offset of said virtual address instruction pointer in said FL_RIP register, said ADDRIP instruction associated with said second ISA.

5. The system of claim 1, wherein virtual page numbers associated with said translated code differ between said first process and said second process due to Address Space Layout Randomization (ASLR).

6. The system of claim 1, wherein said updating of said virtual address instruction pointer is performed in association with execution of a branch instruction.

7. The system of claim 1, wherein said page table is cached in a translation lookaside buffer (TLB).

8. The system of claim 1, wherein said system is selected from the group consisting of a smart phone, a laptop computing device, a smart TV and a smart tablet.

9. The system of claim 1, further comprising a user interface, wherein said user interface is a touch screen.

10. A method for binary translation reuse, said method comprising:
  performing a binary translation of a region of code from a first instruction set architecture (ISA) to a second ISA of a processor, said binary translation for execution associated with a first process;

storing a first physical page number associated with said binary translation and said first process;

storing an offset of a virtual address instruction pointer associated with said binary translation and said first process;

updating said virtual address instruction pointer during execution by said processor; and verifying that said binary translation is valid for reuse for execution associated with a second process, wherein said verification comprises:

generating a second physical page number based on a page table mapping, said mapping based on said updated virtual address instruction pointer and said stored offset; and matching said second physical page number to said stored first physical page number; and wherein said binary translation further comprises embedding a prologue in said translated region of code, said prologue comprising instructions to:

store said first physical page number and said offset; and perform said verification in response to detecting that execution of said binary translation traverses a memory page boundary.

11. The method of claim 10, further comprising:

storing a first page attribute associated with said binary translation and said first process; and determining an updated page attribute associated with said binary translation and said second process; wherein said verifying further comprises matching said stored first page attribute with said updated page attribute.

12. The method of claim 10, further comprising, if said verifying fails, performing a second binary translation of said region of code for execution associated with said second process.

13. The method of claim 10, wherein said updating of said virtual address instruction pointer further comprises:

maintaining said virtual address instruction pointer in a register (FL_RIP); and executing an instruction (ADDRIP) to modify an offset of said virtual address instruction pointer in said FL_RIP register, wherein said ADDRIP instruction is associated with said second ISA.

14. The method of claim 10, wherein virtual page numbers associated with said binary translation differ between said first process and said second process due to Address Space Layout Randomization (ASLR).

15. The method of claim 10, wherein said updating of said virtual address instruction pointer is performed in association with execution of a branch instruction.

16. The method of claim 10, wherein said page table is cached in a translation lookaside buffer (TLB).

17. At least one non-transitory computer-readable storage medium having instructions stored thereon which when executed by a processor result in the following operations for binary translation reuse, said operations comprising:

performing a binary translation of a region of code from a first instruction set architecture (ISA) to a second ISA of the processor, said binary translation for execution associated with a first process;

storing a first physical page number associated with said binary translation and said first process;

storing an offset of a virtual address instruction pointer associated with said binary translation and said first process;

updating said virtual address instruction pointer during execution by said processor; and verifying that said binary translation is valid for reuse for execution associated with a second process, wherein said verification comprises:

generating a second physical page number based on a page table mapping, said mapping based on said updated virtual address instruction pointer and said stored offset; and matching said second physical page number to said stored first physical page number; and wherein said binary translation further comprises the operation of embedding a prologue in said translated region of code, said prologue comprising instructions to:

store said first physical page number and said offset; and perform said verification in response to detecting that execution of said binary translation traverses a memory page boundary.

18. The non-transitory computer-readable storage medium of claim 17, further comprising the operations of:

storing a first page attribute associated with said binary translation and said first process; and determining an updated page attribute associated with said binary translation and said second process;

wherein said verifying further comprises the operation of matching said stored first page attribute with said updated page attribute.

19. The non-transitory computer-readable storage medium of claim 17, further comprising, if said verifying fails, performing a second binary translation of said region of code for execution associated with said second process.

20. The non-transitory computer-readable storage medium of claim 17, wherein said updating of said virtual address instruction pointer further comprises the operations of:

maintaining said virtual address instruction pointer in a register (FLRIP); and executing an instruction (ADDRIP) to modify an offset of said virtual address instruction pointer in said FLRIP register, wherein said ADDRIP instruction is associated with said second ISA.

21. The non-transitory computer-readable storage medium of claim 17, wherein virtual page numbers associated with said binary translation differ between said first process and said second process due to Address Space Layout Randomization (ASLR).

22. The non-transitory computer-readable storage medium of claim 17, wherein said updating of said virtual address instruction pointer is performed in association with execution of a branch instruction.

23. The non-transitory computer-readable storage medium of claim 17, wherein said page table is cached in a translation lookaside buffer (TLB).

* * * * *